(12) United States Patent
Kovie (10) Patent No.: US 9,027,985 B2
(45) Date of Patent: May 12, 2015

(54) RETAINING STRUCTURE FOR A LAMINATED WINDOW PANEL

(71) Applicant: Nissan North America, Inc., Franklin, TN (US)

(72) Inventor: David Kovie, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/901,065

(22) Filed: May 23, 2013

(65) Prior Publication Data

US 2014/0346805 A1   Nov. 27, 2014

(51) Int. Cl.
*B60J 1/17* (2006.01)
*B60J 1/00* (2006.01)
*B60J 5/04* (2006.01)

(52) U.S. Cl.
CPC ...... *B60J 5/0402* (2013.01); *B60J 1/17* (2013.01); *B60J 1/008* (2013.01)

(58) Field of Classification Search
CPC ............. B60J 5/0402; B60J 1/008; B60J 1/17
USPC ............. 296/187.03, 187.05, 187.13, 201, 296/146.2, 96.21, 96.22; 49/502, 483.1
See application file for complete search history.

(56) References Cited

U.S. PATENT DOCUMENTS

| | | | |
|---|---|---|---|
| 4,823,511 A * | 4/1989 | Herliczek et al. | 49/404 |
| 4,901,476 A | 2/1990 | Nagashima et al. | |
| 4,934,099 A * | 6/1990 | Maekawa et al. | 49/352 |
| 8,650,802 B2 * | 2/2014 | Grudzinski et al. | 49/502 |
| 8,793,938 B2 * | 8/2014 | Grudzinski et al. | 49/502 |
| 2010/0212231 A1 | 8/2010 | Phillips | |

* cited by examiner

*Primary Examiner* — Jason S Morrow
(74) *Attorney, Agent, or Firm* — Young, Basile, Hanlon & MacFarlane, P.C.

(57) ABSTRACT

A vehicle having a body structure defining a window opening, the window opening at least partially framed by a window sash defining a sash channel in communication with the window opening; a laminated window panel movable within the window opening along a plane of the window opening; and a retaining structure located between the window sash and the window panel and configured to retentively engage the window panel in the presence of a transverse force on the window panel even if the window panel has become slack.

22 Claims, 6 Drawing Sheets

RETAINING STRUCTURE FOR A LAMINATED WINDOW PANEL

TECHNICAL FIELD

The embodiments disclosed herein generally relate to retaining structures for laminated windows in passenger vehicles.

BACKGROUND

A passenger vehicle may include a window opening for accommodating a moveable window panel. If the window panel becomes structurally compromised, it may crumble or become slack, creating a potential for the window opening to become exposed.

SUMMARY

Disclosed herein are embodiments of retaining systems for a window of a vehicle.

In one aspect, a vehicle comprises: a body structure defining a window opening, the window opening at least partially framed by a window sash defining a sash channel in communication with the window opening; a laminated window panel movable within the window opening along a plane of the window opening; and a retaining structure located between the window sash and the window panel and configured to retentively engage the window panel in the presence of a transverse force on the window panel even if the window panel has become slack.

In another aspect, a retaining system for a window of a vehicle comprises: a window sash extending at least in a window moving direction to at least partially frame a window opening and defining a sash channel in communication with the window opening; a laminated window panel movable within the window opening along a plane of the window opening; and a retaining structure configured to permit movement of the window panel along the sash channel, comprising: a first retaining portion defined by one of the window sash and the window panel, and a second retaining portion protruding into the sash channel toward the first retaining portion, the second retaining portion configured to engage the first retaining portion when the window panel is moved away from the plane of the window opening in the presence of a transverse force on the window panel, to retain the window panel in the sash channel even if the window panel has become slack.

These and other aspects will be described in additional detail below.

BRIEF DESCRIPTION OF THE DRAWINGS

The various features, advantages and other uses of the present apparatus will become more apparent by referring to the following detailed description and drawings in which.

DETAILED DESCRIPTION

A vehicle according to the description that follows can include a retaining system for a moveable window panel. The retaining system can be implemented to keep the window panel in place even if the window panel has become structurally compromised.

Figure 1:
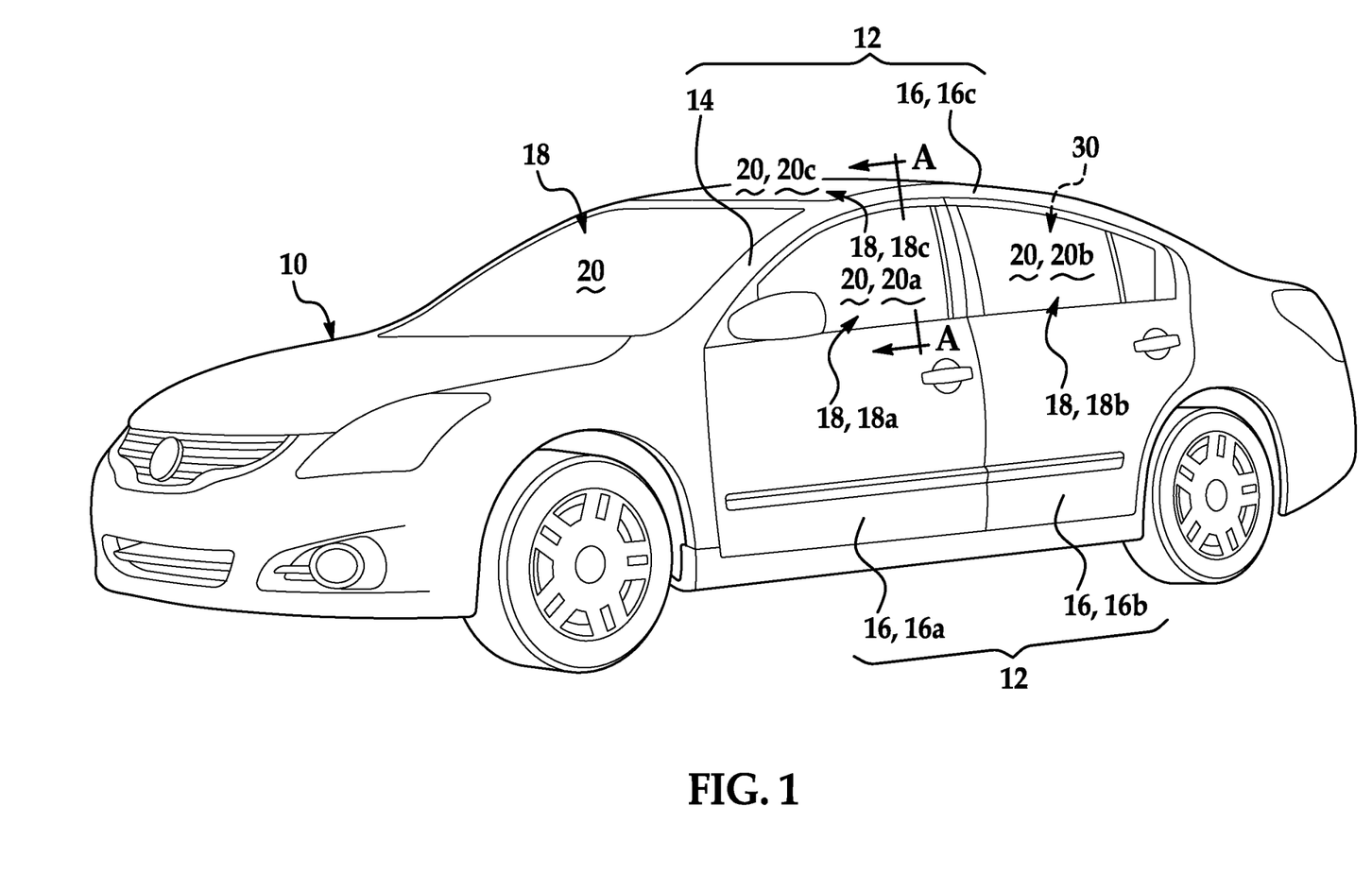
FIG. 1 is a front perspective view of a vehicle having a vehicle body structure defining a plurality of window openings and corresponding window panels.

A representative vehicle 10 is shown in FIG. 1. The vehicle 10 has a vehicle body structure 12, which is generally comprised of a number of frame members 14 and vehicle body panels 16, and is at least partially open to define one or more window openings 18. The window openings 18 are each sized and shaped to accommodate a respective window panel 20 that, together with the frame members 14, vehicle body panels 16 and other window panels 20, defines an interior 30 of the vehicle 10.

Certain of the window panels 20, including a window panel 20a configured as a front driver's side window, a window panel 20b configured as a rear driver's side window and/or a window panel 20c configured as a sun roof, for example, may be retractable or otherwise moveable with respect to the vehicle body structure 12 to expose their respective window openings 18a, 18b and 18c. The window panel 20a and the window opening 18a of the window openings 18 are explained by way of example, and not limitation, in greater detail with additional reference to FIG. 2.

Figure 2:
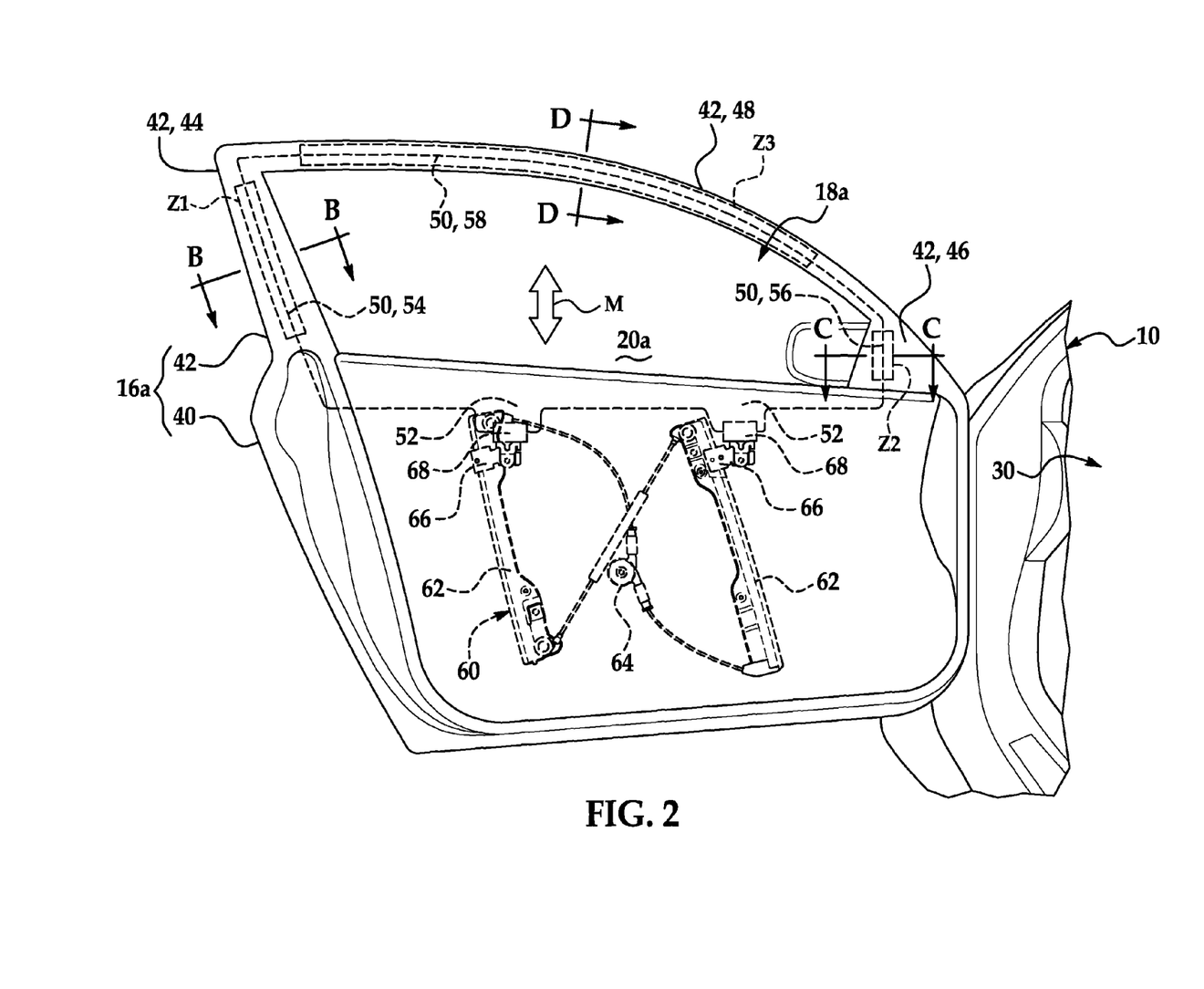
FIG. 2 is a partial rear perspective view of the vehicle of FIG. 1 showing a laminated window panel framed between a door panel and a window sash, and exemplary retention zones configurable with features for retaining the window panel within the window sash.

As shown in FIG. 2, the window opening 18a is defined within a door panel 16a of the vehicle body panels 16. The door panel 16a is pivotally connected to the vehicle body structure 12 as a closure panel that permits ingress to and egress from the interior 30 of the vehicle 10. The door panel 16a generally includes a main body 40 and a window sash 42.

The window sash 42 is rigidly fixed to the main body 40 of the door panel 16a to at least partially frame the window opening 18a, and is sized and shaped to accommodate receipt and removal of a periphery 50 of the window panel 20a during movement of the window panel 20a with respect to the vehicle body structure 12.

The main body 40 of the door panel 16a houses a window regulator 60 configured to support the window panel 20a for selective movement with respect to the vehicle body structure 12. The window regulator 60 generally includes a pair of slides 62 and associated linkage 64 to cause translation of respective carriers 66 along the slides 62 at the command of an operator of the vehicle 10. A base 52 of the window panel 20a opposite the periphery 50 is positioned within the main body 40 of the door panel 16a and coupled to the carriers 66 through respective mounting tabs 68. Upon actuation of the window regulator 60, the carriers 66 are articulated along the respective slides 62 to selectively move the window panel 16a generally within in a plane of the window opening 18a and in a window moving direction M between a retracted position, wherein the window opening 18a is exposed, and the illustrated deployed position. Although an automatic window regulator 60 is shown and described, a manual window regulator 60 could alternatively be used.

When the window panel 20a is in the deployed position, the window panel 20a at least partially spans the window opening 18a, and the base 52 of the window panel 20a is firmly mounted within the main body 40 of the door panel 16a. Additionally, in the deployed position, some or the entire periphery 50 of the window panel 20a is received within respective portions of the window sash 42 that frame the window opening 18a, as explained in additional detail below. According to this description, it will be understood that the window panel 20a may, as shown, fully span the window opening 18a in the deployed position, or alternatively, may only partially span the window opening 18a in the deployed position.

During movement of the window panel 20a, the position of the window panel 20a, as well as the position of the periphery 50 of the window panel 20a, varies with respect to the window sash 42. When the window panel 20a is in the retracted position, the window panel 20a is housed within the main body 40 of the door panel 16a, and the periphery 50 of the window panel 20a is generally removed from the window sash 42, meaning the periphery 50 of the window panel 20a may be entirely removed from the window sash 42 or still partially positioned in the window sash 42.

As the window panel 20a is moved out of the retracted position into a deployed position to partially span the window opening 18a, opposing peripheral portions 54 and 56 of the periphery 50 of the window panel 20a adjacent the base 52, and oriented generally according to the window moving direction M, translate along and within respective outboard portions 44 and 46 of the window sash 42 in the window moving direction M. As the window panel 20a is moved further to fully span the window opening 18a, the opposing peripheral portions 54 and 56 of the periphery 50 of the window panel 20a continue to translate within the respective outboard portions 44 and 46 of the window sash 42. Additionally, a peripheral portion 58 of the periphery 50 of the window panel 20a spaced from and opposite the base 52, and oriented generally transverse to the window moving direction M, is inserted into a distal portion 48 of the window sash 42 spanning between the outboard portions 44 and 46.

Figure 3:
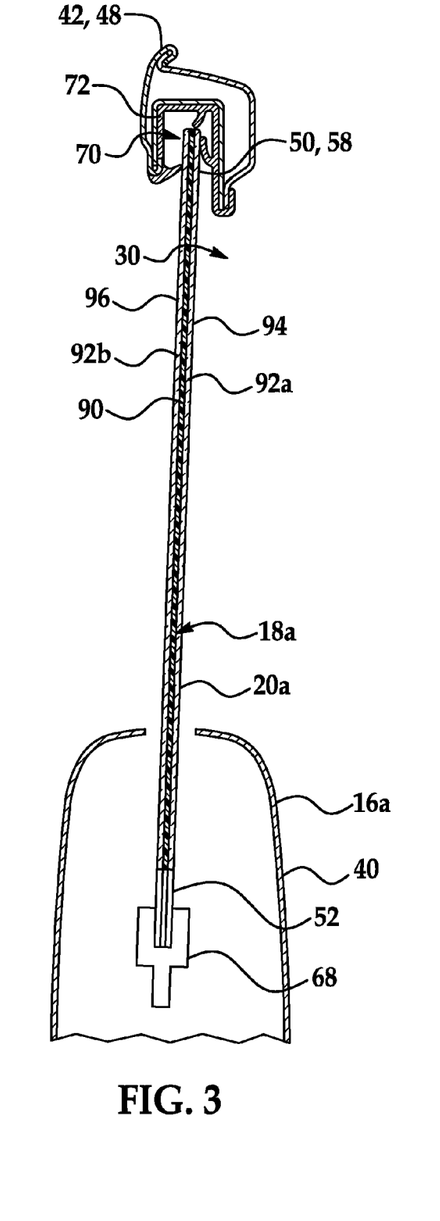
FIG. 3 is a cross section of the window opening and corresponding window panel, taken at a position similar to line A-A in FIG. 1 prior to the window panel being structurally compromised.

A cross section of the door panel 16a and the window panel 20a is shown in FIG. 3 with the window panel 20a in a fully deployed position. As shown, the base 52 of the window panel 20a is mounted within the main body 40 of the door panel 16a, as generally explained above, and the peripheral portion 58 of the periphery 50 of the window panel 20a is fitted within a sash channel 70 defined by the window sash 42 at its distal portion 48. The window sash 42 may, as shown, optionally incorporate a flexible seal 72 between the window sash 42 and the window panel 20a. The seal 72 is shown in FIGS. 3 and 4 but omitted from the remaining Figures for clarity and ease of understanding.

The illustrated construction of the window sash 42, and the fitment of the periphery 50 of the window panel 20a within the sash channel 70, is generally representative of the construction of the remainder of the window sash 42. The upper portion of the illustrated cross section is therefore representative of a cross section taken along the line B-B in FIG. 2 when the window panel 20a is in a deployed position so as to occupy the outboard portion 44 of the window sash 42, a cross section taken along the line C-C in FIG. 2 when the window panel 20a is in a deployed position so as to occupy the outboard portion 46 of the window sash 42, and a cross section taken along the line D-D in FIG. 2 when the window panel 20a is in a fully deployed position so as to occupy the distal portion 48 of the window sash 42.

The window panel 20a and the window opening 18a of the window openings 18 are explained by way of example and not limitation. It is to be understood that this disclosure is applicable in principle to any other window opening 18 which is defined by a vehicle body structure 12 that incorporates a window sash 42 to at least partially frame the window opening 18. For instance, in other non-limiting examples, such a window opening 18 could be the window opening 18b defined wholly or in part by a door panel 16b of the vehicle body panels 16 (and accommodating the window panel 20b), or the window opening 18 defined by a roof panel 16c (and accommodating the window panel 20c configured as a sun roof). In further non-limiting examples, such a window opening 18 could also be defined wholly or in part by a rear divider in a pick-up truck, a lift gate or a sliding door.

Figure 4:
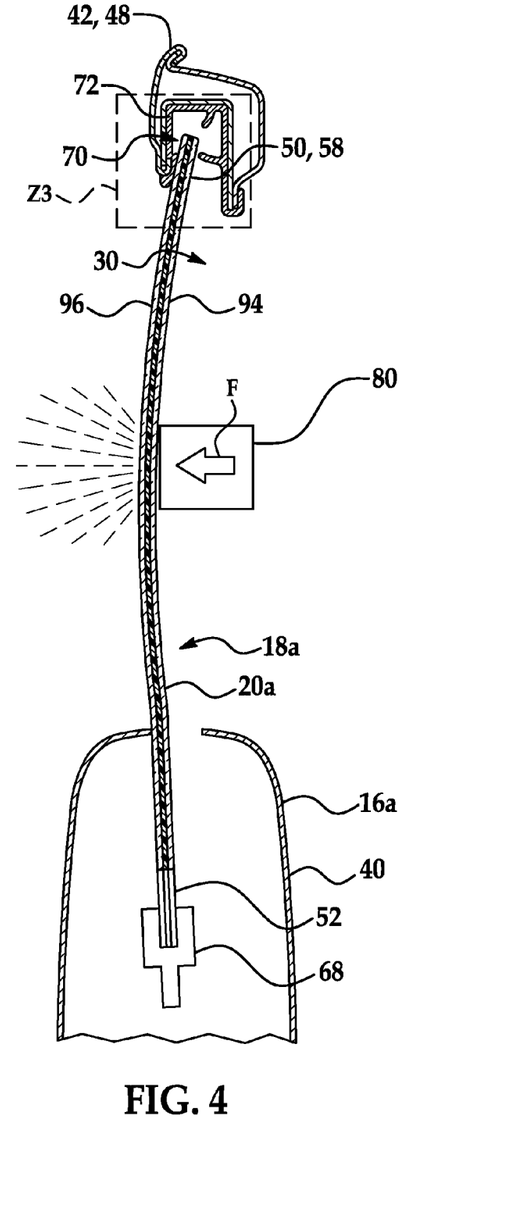
FIG. 4 is a cross section of the window opening and corresponding window panel, taken at a position similar to line A-A in FIG. 1 subsequent to being structurally compromised, and illustrating the function of an exemplary retention zone.

As shown in FIG. 4, the window panel 20a may become structurally compromised. The window panel 20a could become structurally compromised as a result of movement of an object 80 into the window panel 20a, for instance, which can exert a force F sufficient to compromise the structure of the window panel 20a. It will be understood that the object 80 and force F are given as a non-limiting examples, and that the window panel 20a could be otherwise structurally compromised. Tempered glass is, by design, susceptible to crumbling once broken, and exposes the window opening 18a once it is structurally compromised.

In the illustrated vehicle 10, the window panel 20a is constructed as a laminated glass window panel having a thin, flexible PVB layer 90 adhesively sandwiched between a rigid inner layer 92a (forming an interior surface 94 of the window panel 20a) and a rigid outer 92b layer (forming an exterior surface 96 of the window panel 20a) of tempered glass. However, if the rigid inner 92a and outer 92b layers of tempered glass are broken, although the window panel 20a can remain intact due to the PVB layer 90, since the PVB layer 90 is flexible, the window panel 20a as a whole can become slack and capable of flopping out of the window sash 42. Once again, therefore, the window panel 20a of existing designs may expose the window opening 18a once it is structurally compromised.

As disclosed herein with illustrative reference to the examples that follow, retention of the window panel 20 after becoming slack can be achieved through novel construction of the vehicle 10 to include a laminated window panel 20a and retaining structures implementing one or more retention zone(s) Z1, Z2 and/or Z3 bordering the window opening 18a, as indicated in FIGS. 2 and 4.

The retention zones Z1, Z2 and Z3 can be implemented at the outboard portion 44 of the window sash 42, at the opposing outboard portion 46 of the window sash 42, and/or at the distal portion 48 of the window sash 42 spanning between the outboard portions 44 and 46, respectively. In one or more of the retention zones Z1, Z2 and Z3, retaining structures are included to retentively engage the periphery 50 of the window panel 20a proximate the window sash 42, even in the presence of a transverse force on the window panel 20a (i.e., a force or loading having a component transverse to the window panel 20a). The transverse force according this description may be for example a continuation of the force F or other force that compromised the structure of the window panel 20a, another force caused as a result of movement of an object 80 into the window panel 20a, a force caused by movement of the vehicle 10, or any combination of these or other forces. Although the laminated window panel 20a is susceptible to becoming slack when structurally compromised, as noted above, if one or more peripheral portions 54, 56 and 58 of the periphery 50 of the window panel 20a are retentively engaged to remain proximate the window sash 42, the window panel 20a can act as a net to prevent passage of objects 80 through the window opening 18a.

Figure 5A:
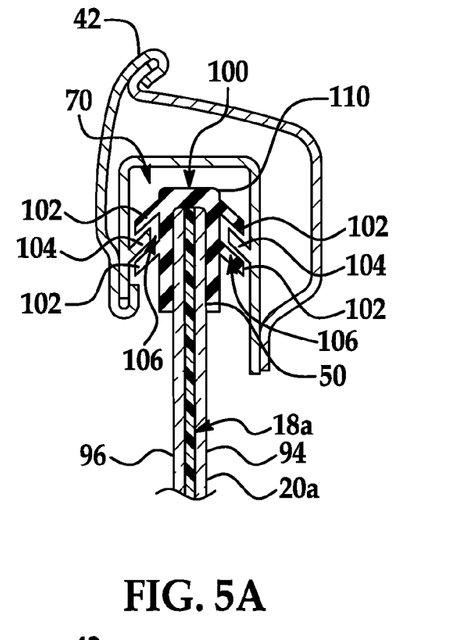
FIGS. 5A and 5B are detailed cross sections of the window sash and corresponding window panel showing, according to a first example, features for retaining the window panel within the window sash when a transverse force is applied to the window panel after the window panel has been structurally compromised.
Figure 5B:
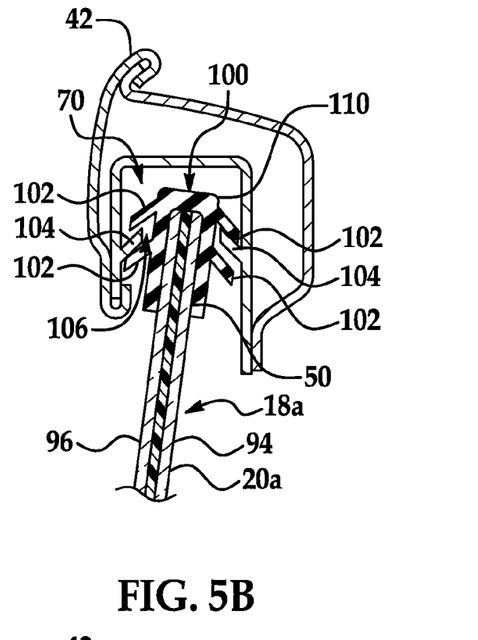

A retaining structure 100 according to a first example and explained with reference to FIGS. 5A and 5B can be used to implement the retention zone(s) Z1 and/or Z2 (that is, the cross sectional view shown can be understood as taken along the line B-B and/or the line C-C in FIG. 2).

The retaining structure 100 is located between the window sash 42 and portions of the periphery 50 of the window panel 20a occupying the sash channel 70. The retaining structure 100 generally comprises a first retaining portion at the periphery 50 of the window panel 20a, having one or more first projections 102 extending from the periphery 50 of the window panel 20a and protruding into the sash channel 70. Further, the retaining structure 100 comprises a second retaining portion at the window sash 42, having one or more second projections 104 protruding into the sash channel 70 from the window sash 42.

As shown, the first retaining portion has two first projections 102 extending into the sash channel 70 from the interior surface 94 of the window panel 20a to interleave a single second projection 104 of the second retaining portion protruding into the sash channel 70 from the window sash 42 toward the interior surface 94 of the window panel 20a, such that the second projection 104 is positioned within a recess 106 defined between the first projections 102. Similarly, the first retaining portion has two first projections 102 extending from the exterior surface 96 of the window panel 20a to interleave a single second projection 104 of the second retaining portion protruding from the window sash 42 toward the exterior surface 96, such that the second projection 104 is positioned within a recess 106 defined between the first projections 102. Optionally, as in the illustrated example, the first projections 102 can extend from a clip 110 affixed to the periphery 50 of the window panel 20a. Alternatively, the first projections 102 could be formed integrally with the periphery 50 of the window panel 20a.

The first projections 102 are angled towards the window opening 18a in the illustrated example, and the second projection 104 is angled away from the window opening 18a. Alternatively, the first projections 102 could be angled away from the window opening 18a and the second projection 104 could be angled towards the window opening 18a, or, both the first projections 102 and the second projection 104 could extend transverse to the periphery 50 of the window panel 20a. Absent movement of the window panel 20a out of a plane of the window opening 18a, the first projections 102 and the second projection 104 are slidably engageable. The slidable engagement may be permissive of sliding contact between the first projections 102 and the second projection 104, or alternatively, the slidable engagement may occur without contact between the first projections 102 and the second projection 104 (that is, the clearance illustrated in FIG. 5A can be maintained). The retaining structure 100 is configured via the slidable engagement to permit translational movement, in a plane of the window opening 18a, of the periphery 50 of the window panel 20a along the sash channel 70 during movement of the window panel 20a to the deployed position.

At least one second projection 104 overlaps the first projection 102 in a direction transverse to the window moving direction M in a plane of the window opening 18a and away from the periphery 50 of the window panel 20a. Therefore, movement of the periphery 50 of the window panel 20a out of the window sash 42 is generally not permitted, for example, upon outboard movement of the window panel 20a out of a plane of the window opening 18a in the presence of a transverse force on the window panel 20a. Rather, as shown in FIG. 5B, the first projections 102 interlock in retentive engagement with the second projections 104, to retain the periphery 50 of the window panel 20a within the window sash 42. Thus, the window panel 20a may be maintained in a deployed position even if the window panel 20a is structurally compromised and becomes slack.

In the above described and illustrated configuration, it will be understood that the retaining structure 100 can be located at portions of the window sash 42 oriented generally according to the window moving direction M. With reference to the illustrated example of FIG. 2, for instance, the retaining structure 100 can be used to implement the retention zone Z1 at the outboard portion 44 of the window sash 42, and/or the retention zone Z2 at the opposing outboard portion 46 of the window sash 42.

Figure 6A:
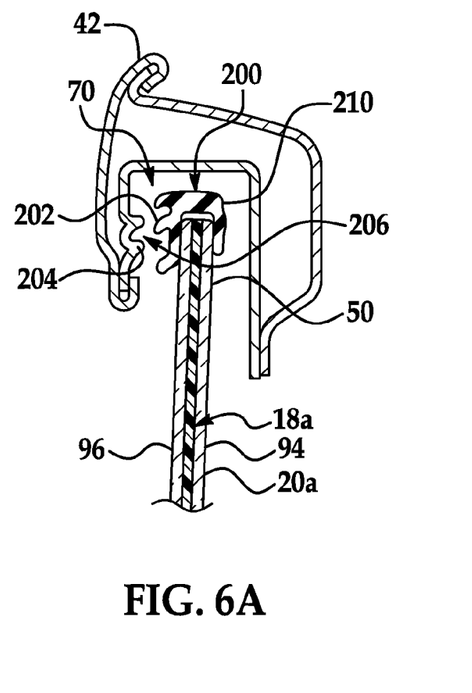
FIGS. 6A and 6B are detailed cross sections of the window sash and corresponding window panel showing, according to a second example, features for retaining the window panel within the window sash when a transverse force is applied to the window panel after the window panel has been structurally compromised.

A retaining structure 200 according to a second example and explained with reference to FIGS. 6A and 6B can be used to implement the retention zone(s) Z1, Z2 and/or Z3 (that is, the cross sectional view shown can be understood as taken along the line B-B, the line C-C and/or the line D-D in FIG. 2).

The retaining structure 200 is located between the window sash 42 and portions of the periphery 50 of the window panel 20a occupying the sash channel 70. The retaining structure 200 generally comprises a first retaining portion at the periphery 50 of the window panel 20a, having one or more first projections 202 extending from the periphery 50 of the window panel 20a and protruding into the sash channel 70. The retaining structure 200 further comprises a second retaining portion at the window sash 42, having one or more second projections 204 protruding into the sash channel 70 from the window sash 42. (Only one first projection 202, second projection 204 and recess 206 are indicated with a reference numeral in FIGS. 6A and 6B for clarity). The second projections 204 are angled away from the window opening 18a to define respective recesses 206 between the respective second projection 204, the window sash 42 and an adjacent second projection 204. The first projections 202 are angled towards the window opening 18a and protrude into the sash channel 70 towards the recesses 206. Optionally, as in the illustrated example, the first projections 202 can extend from a clip 210 affixed to the periphery 50 of the window panel 20a. Alternatively, the second projections 202 could be formed integrally with the periphery 50 of the window panel 20a.

As shown, the first retaining portion has three first projections 202 extending into the sash channel 70 from the exterior surface 96 of the window panel 20a to face three recesses 206 defined between the window sash 42 and respective second projections 204. Absent movement of the window panel 20a out of a plane of the window opening 18a, the first projections 202 and the second projections 204 do not overlap or interfere with one another. The retaining structure 200 is therefore configured to permit translational movement, in a plane of the window opening 18a, of the periphery 50 of the window panel 20a along the sash channel 70 during movement of the window panel 20a to the deployed position. Additionally, the retaining structure 200 is configured to permit insertion, in a plane of the window opening 18a, of the periphery 50 of the window panel 20a into the sash channel 70 as the window panel 20a reaches a fully deployed position.

Figure 6B:
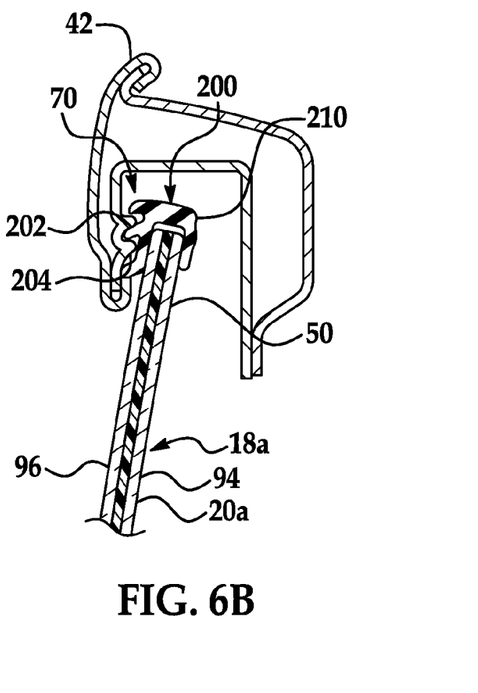

However, upon outboard movement of the window panel 20a out of a plane of the window opening 18a, in the presence of a transverse force on the window panel 20a, the first projections 202 can seat into the recesses 206, as shown in FIG. 6B, to retain the periphery 50 of the window panel 20a within the window sash 42. Thus, the window panel 20a may be maintained in a deployed position even if the window panel 20a is structurally compromised and becomes slack. The first projections 202 and/or second projections 204 can be provided in alternate numbers and/or configurations. As shown, multiple of the first projections 202 are positioned to seat into any one of a plurality of the recesses 206, such that upon outboard movement of the window panel 20a, there are multiple opportunities for a first projection 202 to seat into a recess 206.

In the above described and illustrated configuration, it will be understood that the retaining structure 200 can be located at portions of the window sash 42 oriented generally according to the window moving direction M. With reference to the illustrated example of FIG. 2, for instance, the retaining structure 200 can be used to implement the retention zone Z1 at the outboard portion 44 of the window sash 42, and/or the retention zone Z2 at the opposing outboard portion 46 of the window sash 42. Additionally, the retaining structure 200 can be located at portions of the window sash 42 oriented generally transverse to the window moving direction M. For the illustrated example of FIG. 2, for instance, the retaining structure 200 can be used to implement the retention zone Z3 at the distal portion 48 of the window sash 42 spanning between the outboard portions 44 and 46 of the window sash 42.

Figure 7A:
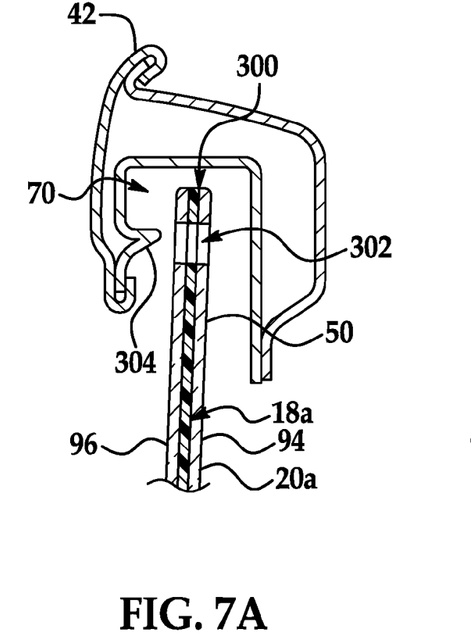
FIGS. 7A and 7B are detailed cross sections of the window sash and corresponding window panel showing, according to a third example, features for retaining the window panel within the window sash when a transverse force is applied to the window panel after the window panel has been structurally compromised.

A retaining structure 300 according to a third example and explained with reference to FIGS. 7A and 7B can be used to implement the retention zone(s) Z1, Z2 and/or Z3 (that is, the cross sectional view shown can be understood as taken along the line B-B, the line C-C and/or the line D-D in FIG. 2).

The retaining structure 300 is located between the window sash 42 and portions of the periphery 50 of the window panel 20a occupying the sash channel 70. The retaining structure 300 generally comprises a first retaining portion, which in this example is a recess 302 defined at the periphery 50 of the window panel 20a. The recess 302 can be a through aperture as shown, or can be any other discontinuous surface portion at the exterior surface 96 of the window panel 20a such as a recess. The retaining structure 300 further comprises a second retaining portion at the window sash 42, having a second projection 304 protruding into the sash channel 70 towards the recesses 302 from a portion of the window sash 42 opposing the exterior surface 96 of the window panel 20a.

Absent movement of the window panel 20a out of a plane of the window opening 18a, the second projection 304 does not interfere with the aperture or recess 302 or the periphery 50 of the window panel 20a. The retaining structure 300 is therefore configured to permit translational movement, in a plane of the window opening 18a, of the periphery 50 of the window panel 20a along the sash channel 70 during movement of the window panel 20a to the deployed position. Additionally, the retaining structure 300 is configured to permit insertion, in a plane of the window opening 18a, of the periphery 50 of the window panel 20a into the sash channel 70 as the window panel 20a reaches a fully deployed position.

Figure 7B:
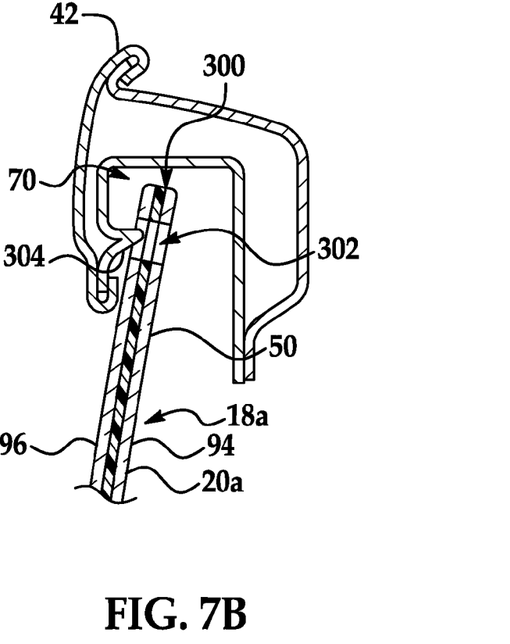

Upon outboard movement of the window panel 20a out of a plane of the window opening 18a, in the presence of a transverse force on the window panel 20a, the second projection 304 can seat into the apertures or recesses 302, as shown in FIG. 7B, to retain the periphery 50 of the window panel 20a within the window sash 42. Thus, the window panel 20a may be maintained in a deployed position even if the window panel 20a is structurally compromised and becomes slack.

In the above described and illustrated configuration, it will be understood that the retaining structure 300 can be located at portions of the window sash 42 oriented generally according to the window moving direction M. With reference to the illustrated example of FIG. 2, for instance, the retaining structure 300 can be used to implement the retention zone Z1 at the outboard portion 44 of the window sash 42, and/or the retention zone Z2 at the opposing outboard portion 46 of the window sash 42. Additionally, the retaining structure 300 can be located at portions of the window sash 42 oriented generally transverse to the window moving direction M. For the illustrated example of FIG. 2, for instance, the retaining structure 300 can be used to implement the retention zone Z3 at the distal portion 48 of the window sash 42 spanning between the outboard portions 44 and 46 of the window sash 42.

Figure 8A:
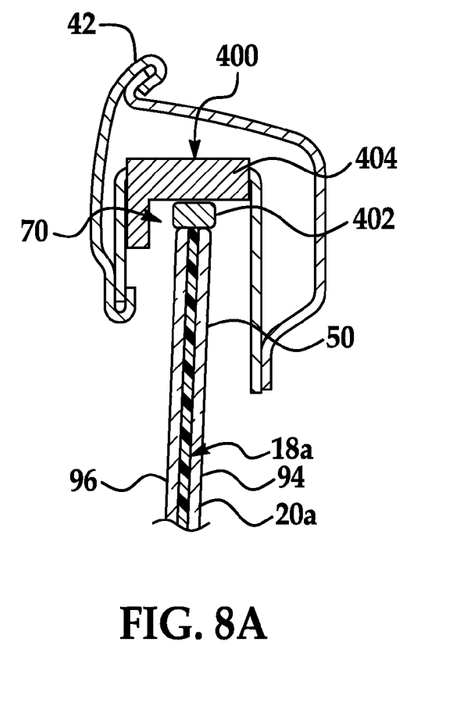
FIGS. 8A and 8B are detailed cross sections of the window sash and corresponding window panel showing, according to a fourth example, features for retaining the window panel within the window sash when a transverse force is applied to the window panel after the window panel has been structurally compromised.
Figure 8B:
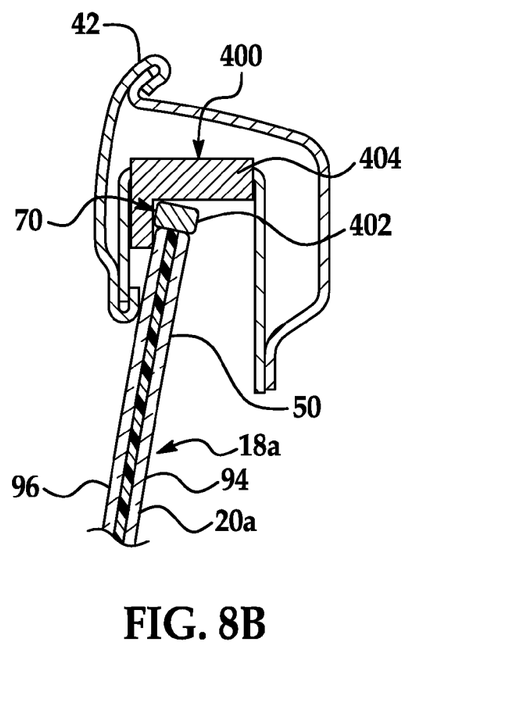

A retaining structure 400 according to a fourth example and explained with reference to FIGS. 8A and 8B can be used to implement the retention zone(s) Z1, Z2 and/or Z3 (that is, the cross sectional view shown can be understood as taken along the line B-B, the line C-C and/or the line D-D in FIG. 2).

The retaining structure 400 is located between the window sash 42 and portions of the periphery 50 of the window panel 20a occupying the sash channel 70. The retaining structure 400 generally comprises a first retaining portion 402 at the periphery 50 of the window panel 20a, and a second retaining portion 404 at the window sash 42. The retaining structure 400 is configured to permit translational movement, in a plane of the window opening 18a, of the periphery 50 of the window panel 20a along the sash channel 70 during movement of the window panel 20a to the deployed position. Additionally, the retaining structure 400 is configured to permit insertion, in a plane of the window opening 18a, of the periphery 50 of the window panel 20a into the sash channel 70 as the window panel 20a reaches a fully deployed position.

In this example, the second retaining portion 404 is magnetically attractable to the first retaining portion 402 to retain the periphery 50 of the window panel 20a within the window sash 42. The magnetic attraction can be activated upon outboard movement of the window panel 20a out of a plane of the window opening 18a, in the presence of a transverse force on the window panel 20a, for example. Alternatively, the magnetic attraction can arise automatically when the first retaining portion 402 is brought into proximity with the second retaining portion 404. Thus, the window panel 20a may be maintained in a deployed position even if the window panel 20a is structurally compromised and becomes slack.

In the above described and illustrated configuration, it will be understood that the retaining structure 400 can be located at portions of the window sash 42 oriented generally according to the window moving direction M. With reference to the illustrated example of FIG. 2, for instance, the retaining structure 400 can be used to implement the retention zone Z1 at the outboard portion 44 of the window sash 42, and/or the retention zone Z2 at the opposing outboard portion 46 of the window sash 42. Additionally, the retaining structure 400 can be located at portions of the window sash 42 oriented generally transverse to the window moving direction M. For the illustrated example of FIG. 2, for instance, the retaining structure 400 can be used to implement the retention zone Z3 at the distal portion 48 of the window sash 42 spanning between the outboard portions 44 and 46 of the window sash 42.

A retaining structure 500 according to a fifth example and explained with reference to FIGS. 9A-9C can be used to implement the retention zone Z3 (that is, the cross sectional view shown can be understood as taken along the line D-D in FIG. 2).

The retaining structure 500 is located between the window sash 42 and portions of the periphery 50 of the window panel 20a occupying the sash channel 70. The retaining structure 500 generally comprises a first lever 520a supported by a pivot 522 to position a loading end 524 in a space 530 occupied by the periphery 530 of the window panel 20a when the window panel 20a is moved into a fully deployed position. The first lever 520a also positions an effort end 526 to engage the exterior surface 96 of the window panel 20a at the periphery 530 upon movement of the loading end 524 out of the space 530. A similarly constructed and supported second lever 520b positions an effort end 526 to engage the interior surface 94 of the window panel 20a at the periphery 530 upon movement of the loading end 524 out of the space 530.

Figure 9A:
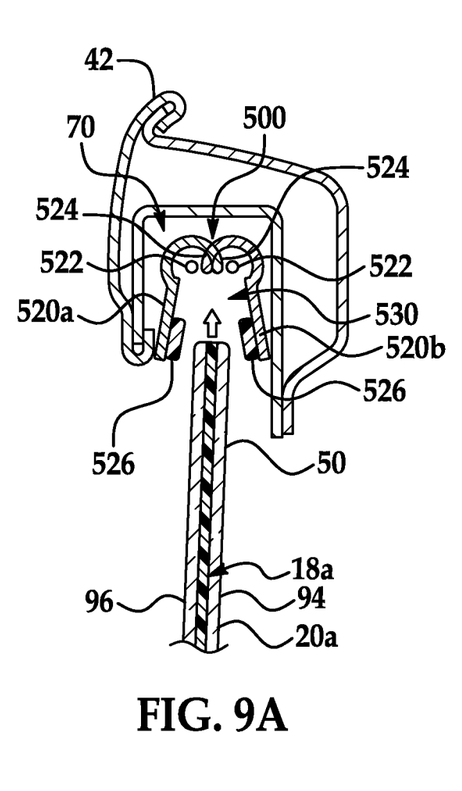
FIGS. 9A-9C are detailed cross sections of the window sash and corresponding window panel showing, according to a fifth example, features for retaining the window panel within the window sash when a transverse force is applied to the window panel after the window panel has been structurally compromised.
Figure 9B:
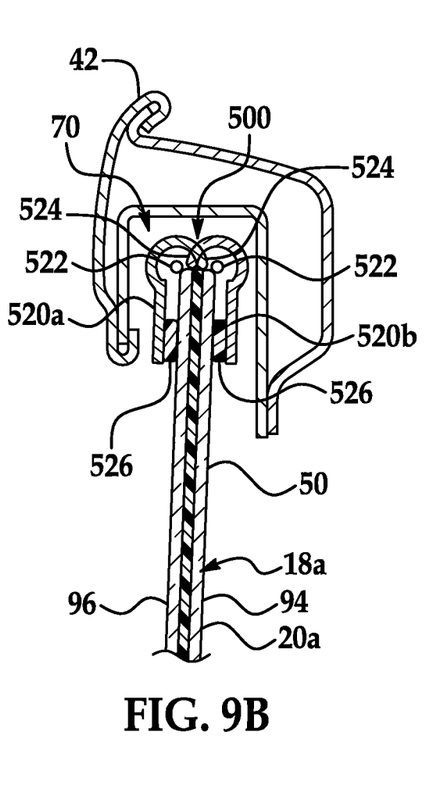
Figure 9C:
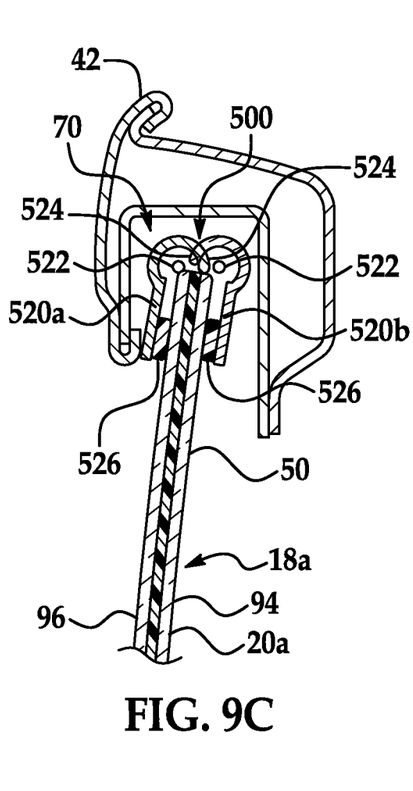

As indicated by FIGS. 9A and 9B, the effort ends 524 of the first and second levers 520a and 520b are drivable to engage the periphery 50 of the window panel 20a in response to movement of the periphery 50 of the window panel 20a to displace the loading ends 526 in the space 530. The first and second levers 520a and 520b may be configured such that, absent movement of the window panel 20a out of a plane of the window opening 18a, removal in a plane of the window opening 18a of the periphery 50 of the window panel 20a out of the sash channel 70 is permitted as the window panel 20a retracts from a fully deployed position. However, upon outboard movement of the window panel 20a, out of a plane of the window opening 18a, in the presence of a transverse force on the window panel 20a, the first and second levers 520a and 520b may be configured to retentively engage the periphery 50 of the window panel 20a within the window sash 42, as shown in FIG. 9C. Thus, the window panel 20a may be maintained in a deployed position even if the window panel 20a is structurally compromised and becomes slack.

In the above described and illustrated configuration, it will be understood that the retaining structure 500 can be located at portions of the window sash 42 oriented generally transverse to the window moving direction M. For the illustrated example of FIG. 2, for instance, the retaining structure 500 can be used to implement the retention zone Z3 at the distal portion 48 of the window sash 42 spanning between the outboard portions 44 and 46 of the window sash 42.

The retaining structures of the above described examples are not mutually exclusive in use and can be used in combination with one another as desired. The retaining structures are offered as examples for improving retention of a laminated glass panel in the deployed position.

While the retaining structures may be used to implement the retention zones Z1, Z2 and Z3, it is contemplated that fewer than all of the retention zones Z1, Z2 and Z3 can be implemented, depending upon the configuration and placement of a window opening 18 with respect to the vehicle body structure 12. The opportunity for retention may be considered as relative to extent to which the window panel 20a is maintained in a deployed position once structurally compromised. This can be conceptualized as a perimeter defined between the base 52 of the window panel 20a, which is firmly mounted within the main body 40 of the door panel 16a, and any portions of the periphery 50 of the window panel 20a located at an implemented retention zone Z1, Z2 or Z3. It is contemplated, for the exemplary window opening 18a for instance, that the advantages of the retaining structures can be substantially realized when the window panel 20a in is a fully deployed position through implementation of only the retention zones Z1 and Z2, or only the retention zone Z3. In addition, it can be seen that the retention zones Z1 and Z2 are particularly advantageous in maximizing opportunities for retention when the window panel 20a is in a less than fully deployed position.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
    a body structure defining a window opening, the window opening at least partially framed by a window sash defining a sash channel in communication with the window opening;
    a laminated window panel movable within the window opening along a plane of the window opening; and
    a retaining structure configured to retentively engage the window panel in the presence of a transverse force on the window panel even if the window panel has become slack, the retaining structure comprising a first retaining portion at a periphery portion of the window panel and a second retaining portion at the window sash, wherein the first retaining portion and the second retaining portion define a gap therebetween when the periphery portion of the window panel is within the sash channel and the window panel is within the plane of the window opening, wherein the periphery portion of the window panel is an upper transverse periphery portion and the second retaining portion is at an upper transverse section of the window sash, and wherein the gap allows non-contact entry and exit of the upper transverse periphery portion of the window panel into the sash channel during movement of the window panel along the plane of the window opening.

2. A retaining system for a window of a vehicle, comprising:
    a window sash extending to at least partially frame a window opening and defining a sash channel in communication with the window opening;
    a laminated window panel movable within the window opening along a plane of the window opening; and
    a retaining structure configured to permit movement of the window panel along the sash channel, comprising:

a first retaining portion defined by the window panel, and a second retaining portion defined by the window sash, wherein the second retaining portion comprises a first projection protruding into the sash channel at an obtuse angle and the first retaining portion is defined by a pair of second projections protruding into the sash channel at an obtuse angle from the window panel oriented to interleave the first projection, the second retaining portion configured to engage the first retaining portion when the window panel is moved away from the plane of the window opening in the presence of a transverse force on the window panel, to retain the window panel in the sash channel even if the window panel has become slack.

3. The retaining system of claim 2, wherein the window sash is oriented to extend in a window moving direction, and the retaining structure is configured to permit translation of the window panel along the sash channel during movement of the window panel.

4. The retaining system of claim 2, wherein the retaining structure is oriented to extend transverse to a window moving direction, and the retaining structure is permissive of insertion of the window panel into the sash channel during movement of the window panel.

5. A vehicle, comprising:
a body structure defining a window opening, the window opening at least partially framed by a window sash defining a sash channel in communication with the window opening;
a laminated window panel movable within the window opening along a plane of the window opening; and
a retaining structure configured to retentively engage the window panel in the presence of a transverse force on the window panel even if the window panel has become slack, the retaining structure comprising a first retaining portion at a periphery portion of the window panel and a second retaining portion at the window sash, wherein the first retaining portion and the second retaining portion define a gap therebetween when the periphery portion of the window panel is within the sash channel and the window panel is within the plane of the window opening, wherein the first retaining portion and the second retaining portion of the retaining structure are configured to contact the other to retentively engage the window panel only in response to the presence of the transverse force on the window panel.

6. The retaining system of claim 2, wherein:
the first retaining portion comprises at least one first projection protruding into the sash channel at an obtuse angle from the window panel into a channel opening; and
the second retaining portion comprises at least one second projection protruding into the sash channel, wherein:
the at least one first projection and the at least one second projection are slidably engageable to permit translation of the window panel along the sash channel while maintaining the gap during movement of the window panel, and retentively engagable upon outboard movement of the window panel in response to the presence of the transverse force on the window panel.

7. The retaining system of claim 6, wherein the at least one first projection is a pair of first projections, and the at least one second projection protruding from the window sash is interleaved by the pair of first projections protruding at the obtuse angle from the window panel.

8. The retaining system of claim 2, wherein the first retaining portion is a clip affixed to the window panel from which the at least one first projection protrudes.

9. The vehicle of claim 5, wherein the second retaining portion comprises:
a plurality of recesses defined by the window sash; and
the first retaining portion comprises a plurality of first projections protruding into the sash channel towards the recesses from the window panel at an obtuse angle, each of the plurality of first projections angled toward the window opening and positioned to seat within any of the recesses upon outboard movement of the window panel in response to the presence of the transverse force on the window panel.

10. The vehicle of claim 9, wherein each of the plurality of recesses is defined between the window sash and one of a plurality of second projections protruding from the window sash into the sash channel and angled away from the window opening.

11. The vehicle of claim 5, wherein one of the first retaining portion and the second retaining portion comprises a recess; and
the other of the first retaining portion and the second retaining portion comprises a projection protruding into the sash channel toward the recess and positioned to seat within the recess upon outboard movement of the window panel in response to the presence of the transverse force on the window panel.

12. The vehicle of claim 11, wherein the recess is defined by the window panel, and the projection protrudes from the window sash.

13. A retaining system for a window of a vehicle, comprising:
a window sash extending to at least partially frame a window opening and defining a sash channel in communication with the window opening;
a laminated window panel movable within the window opening along a plane of the window opening; and
a retaining structure configured to permit movement of the window panel along the sash channel, comprising:
a first retaining portion defined by one of the window sash and the window panel, and
a second retaining portion defined by the other of the window sash and the window panel, wherein one of the first retaining portion and the second retaining portion comprises a first projection protruding into the sash channel at an obtuse angle, the second retaining portion configured to engage the first retaining portion when the window panel is moved away from the plane of the window opening in the presence of a transverse force on the window panel, to retain the window panel in the sash channel even if the window panel has become slack, wherein the first retaining portion comprises a plurality of recesses defined by the window sash and on an outboard side of the retaining structure, and the second retaining portion comprises a plurality of first projections protruding into the sash channel at an obtuse angle towards the recesses from the window panel, each first projection angled toward the window opening and positioned to seat within any of the recesses upon movement of the window panel away from the plane of the window opening in the presence of the transverse force on the window panel to retain the window panel in the sash channel.

14. The retaining system of claim 13, wherein the second retaining portion is defined by the window sash and comprises the first projection, and the first retaining portion is defined by a pair of second projections protruding into the sash channel at an obtuse angle from the window panel oriented to interleave the first projection.

15. The retaining system of claim 2, wherein the pair of second projections protrudes from a clip affixed to the peripheral portion of the window panel.

16. The vehicle of claim 1, wherein the first retaining portion comprises a plurality of recesses defined by the window sash and on an outboard side of the retaining structure, and the second retaining portion comprises a plurality of first projections protruding into the sash channel at an obtuse angle towards the recesses from the window panel, each first projection angled toward the window opening and positioned to seat within any of the recesses upon movement of the window panel away from the plane of the window opening in the presence of the transverse force on the window panel to retain the window panel in the sash channel.

17. The vehicle of claim 16, wherein each of the plurality of recesses is defined between a corresponding pair of second projections protruding from the window sash into the sash channel and angled away from the window opening.

18. The vehicle of claim 1, wherein the first retaining portion is a recess defined by the window panel, and the second retaining portion is a projection protruding from the window sash.

19. The retaining system of claim 14, wherein the first retaining portion and the second retaining portion define a gap therebetween when the window panel is within the sash channel.

20. The retaining system of claim 19, wherein the first retention portion is on an upper transverse edge of the window panel and the second retention portion is at an upper transverse section of the window sash, and wherein the gap allows non-contact entry and exit of the upper transverse edge of the window panel into the sash channel during movement of the window panel along the plane of the window opening.

21. The vehicle of claim 1, wherein one of the first retaining portion and the second retaining portion comprises a recess; and the other of the first retaining portion and the second retaining portion comprises a projection protruding into the sash channel toward the recess and positioned to seat within the recess upon outboard movement of the window panel in response to the presence of the transverse force on the window panel.

22. The retaining system of claim 13, wherein the first retaining portion and the second retaining portion of the retaining structure are configured to contact the other to retentively engage the window panel in response to the presence of the transverse force on the window panel.

* * * * *